US012676958B2

(12) United States Patent
Jang et al.

(10) Patent No.: US 12,676,958 B2
(45) Date of Patent: Jul. 7, 2026

(54) IMAGE ENCODING/DECODING METHOD AND APPARATUS BASED ON PALETTE MODE, AND RECORDING MEDIUM THAT STORES BITSTREAM

(71) Applicant: LG ELECTRONICS INC., Seoul (KR)

(72) Inventors: Hyeong Moon Jang, Seoul (KR); Jung Hak Nam, Seoul (KR); Sunmi Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 17/912,692

(22) PCT Filed: Mar. 19, 2021

(86) PCT No.: PCT/KR2021/003432
§ 371 (c)(1),
(2) Date: Sep. 19, 2022

(87) PCT Pub. No.: WO2021/187946
PCT Pub. Date: Sep. 23, 2021

(65) Prior Publication Data
US 2023/0179760 A1      Jun. 8, 2023

Related U.S. Application Data

(60) Provisional application No. 62/994,829, filed on Mar. 25, 2020, provisional application No. 62/992,139, filed on Mar. 19, 2020.

(51) Int. Cl.
H04N 19/105      (2014.01)
H04N 19/176      (2014.01)
(Continued)

(52) U.S. Cl.
CPC ......... H04N 19/105 (2014.11); H04N 19/176 (2014.11); H04N 19/186 (2014.11); H04N 19/46 (2014.11)

(58) Field of Classification Search
None
See application file for complete search history.

(56) References Cited

U.S. PATENT DOCUMENTS

| | | | |
|---|---|---|---|
| 2018/0098093 A1 | 4/2018 | Ye et al. | |
| 2021/0092393 A1* | 3/2021 | Chao ...................... | H04N 19/50 |
| 2021/0203953 A1* | 7/2021 | Sarwer .................. | H04N 19/70 |

FOREIGN PATENT DOCUMENTS

| | | |
|---|---|---|
| KR | 20170007461 | 1/2017 |
| KR | 20170094544 | 8/2017 |
| KR | 20180010260 | 1/2018 |

OTHER PUBLICATIONS

Chen et al., "Non-CE8: Context coded bin constraint for palette mode signaling," JVET-P0523, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

* cited by examiner

*Primary Examiner* — Chikaodili E Anyikire
(74) *Attorney, Agent, or Firm* — Fish & Richardson P.C.

(57)      ABSTRACT

An image encoding/decoding method and apparatus are provided. The image decoding method comprises obtaining palette prediction information and palette index information of a current block from a bitstream, constructing a palette table for the current block based on the palette prediction information, generating a palette index map for the current block based on the palette index information, and decoding the current block based on the palette table and the palette index map. The palette prediction information may comprise run-value information specifying a first palette entry reused (Continued)

in the palette table among palette entries in the palette predictor for the current block, the run-value information may be obtained from the bitstream only when an index value of the first palette entry is smaller than a first size of the palette predictor, and last run-value information of the palette predictor may have a first value for terminating search of the first palette entry, based on the first palette entry being a last reused palette entry in the palette table.

14 Claims, 12 Drawing Sheets

(51) Int. Cl.
    *H04N 19/186*          (2014.01)
    *H04N 19/46*            (2014.01)

FIG. 7

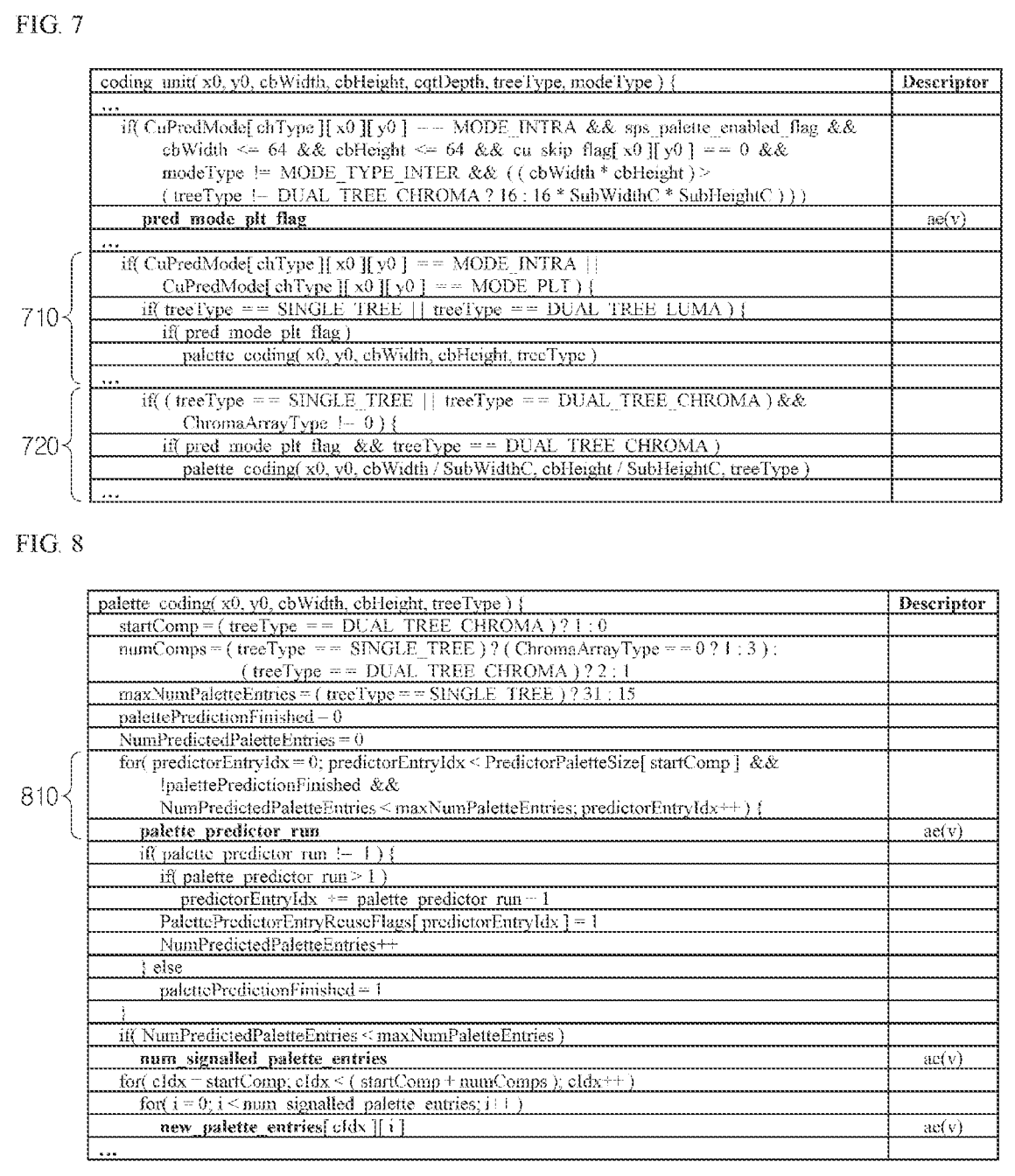

| coding_unit( x0, y0, cbWidth, cbHeight, cqtDepth, treeType, modeType ) { | Descriptor |
|---|---|
| ... | |
| if( CuPredMode[ chType ][ x0 ][ y0 ] == MODE_INTRA && sps_palette_enabled_flag && cbWidth <= 64 && cbHeight <= 64 && cu_skip_flag[ x0 ][ y0 ] == 0 && modeType != MODE_TYPE_INTER && ( ( cbWidth * cbHeight ) > ( treeType != DUAL_TREE_CHROMA ? 16 : 16 * SubWidthC * SubHeightC ) ) ) | |
|    pred_mode_plt_flag | ae(v) |
| ... | |
| if( CuPredMode[ chType ][ x0 ][ y0 ] == MODE_INTRA \|\| CuPredMode[ chType ][ x0 ][ y0 ] == MODE_PLT ) { | |
|   if( treeType == SINGLE_TREE \|\| treeType == DUAL_TREE_LUMA ) { | |
|     if( pred_mode_plt_flag ) | |
|       palette_coding( x0, y0, cbWidth, cbHeight, treeType ) | |
| ... | |
| if( ( treeType == SINGLE_TREE \|\| treeType == DUAL_TREE_CHROMA ) && ChromaArrayType != 0 ) { | |
|   if( pred_mode_plt_flag && treeType == DUAL_TREE_CHROMA ) | |
|     palette_coding( x0, y0, cbWidth / SubWidthC, cbHeight / SubHeightC, treeType ) | |
| ... | |

710 { (braces spanning the MODE_INTRA/MODE_PLT block)

720 { (braces spanning the SINGLE_TREE/DUAL_TREE_CHROMA block)

FIG. 8

| palette_coding( x0, y0, cbWidth, cbHeight, treeType ) { | Descriptor |
|---|---|
|   startComp = ( treeType == DUAL_TREE_CHROMA ) ? 1 : 0 | |
|   numComps = ( treeType == SINGLE_TREE ) ? ( ChromaArrayType == 0 ? 1 : 3 ) : ( treeType == DUAL_TREE_CHROMA ) ? 2 : 1 | |
|   maxNumPaletteEntries = ( treeType == SINGLE_TREE ) ? 31 : 15 | |
|   palettePredictionFinished = 0 | |
|   NumPredictedPaletteEntries = 0 | |
|   for( predictorEntryIdx = 0; predictorEntryIdx < PredictorPaletteSize[ startComp ] && !palettePredictionFinished && NumPredictedPaletteEntries < maxNumPaletteEntries; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|     } | |
|   if( NumPredictedPaletteEntries < maxNumPaletteEntries ) | |
|     num_signalled_palette_entries | ae(v) |
|   for( cIdx = startComp; cIdx < ( startComp + numComps ); cIdx++ ) | |
|     for( i = 0; i < num_signalled_palette_entries; i++ ) | |
|       new_palette_entries[ cIdx ][ i ] | ae(v) |
|   ... | |

810 { (braces spanning the for predictorEntryIdx loop initialization block)

width height

CU[0]　CU[1]　CU[2]

CU[3]

Predictor palette entries                                           PredPLT

| index | 0 | 1 | 2 | 3 | 4 | 5 | 6 | 7 | 8 | ··· | 60 | 61 | 62 |
|-------|---|---|---|---|---|---|---|---|---|-----|----|----|----|
| Y | 102 | 84 | 549 | 843 | 345 | 62 | 994 | | | | | | |
| Cb | 102 | 84 | 549 | 102 | 84 | 549 | 102 | | | | | | |
| Cr | 345 | 62 | 994 | 345 | 62 | 994 | 345 | | | | | | | width height

CU[0]　CU[1]　CU[2]

CU[3]

Predictor palette entries
(PredictorPaletteSize[startComp]==7)                                PredPLT

| index | 0 | 1 | 2 | 3 | 4 | 5 | 6 | 7 | 8 | ··· | 60 | 61 | 62 |
|-------|---|---|---|---|---|---|---|---|---|-----|----|----|----|
| Y | 102 | 84 | 549 | 843 | 345 | 62 | 994 | | | | | | |
| Cb | 102 | 84 | 549 | 102 | 84 | 549 | 102 | | | | | | |
| Cr | 345 | 62 | 994 | 345 | 62 | 994 | 345 | | | | | | | palette_predictor_run
0(indicate entry index 0) -> 3(indicate entry index 3)
  -> 2(indicate entry index 5) -> 1(termination)

FIG. 11

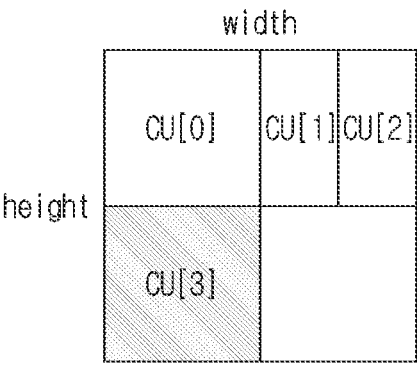

width

| | CU[0] | CU[1] | CU[2] |
| | CU[3] | | | height

Predictor palette entries
(PredictorPaletteSize[startComp]==7)                    PredPLT

| index | 0 | 1 | 2 | 3 | 4 | 5 | 6 | 7 | 8 | ··· | 60 | 61 | 62 |
|---|---|---|---|---|---|---|---|---|---|---|---|---|---|
| Y | 102 | 84 | 549 | 843 | 345 | 62 | 994 | | | | | | |
| Cb | 102 | 84 | 549 | 102 | 84 | 549 | 102 | | | | | | |
| Cr | 345 | 62 | 994 | 345 | 62 | 994 | 345 | | | | | | | palette_predictor_run
0(indicate entry index 0) -> 3(indicate entry index 3)
 -> 2(indicate entry index 5) -> 0(indicate entry index 6)

FIG. 12

| | Descriptor |
|---|---|
| palette_coding( x0, y0, cbWidth, cbHeight, treeType ) { | |
| startComp = ( treeType == DUAL_TREE_CHROMA ) ? 1 : 0 | |
| numComps = ( treeType == SINGLE_TREE ) ? ( ChromaArrayType == 0 ? 1 : 3 ) : ( treeType == DUAL_TREE_CHROMA ) ? 2 : 1 | |
| maxNumPaletteEntries = ( treeType == SINGLE_TREE ) ? 31 : 15 | |
| palettePredictionFinished = 0 | |
| NumPredictedPaletteEntries = 0 | |
| 1210 { for( predictorEntryIdx = 0; predictorEntryIdx < maxNumPalettePredictorSize && !palettePredictionFinished && NumPredictedPaletteEntries < maxNumPaletteEntries; predictorEntryIdx++ ) { | |
| palette_predictor_run | ae(v) |
| if( palette_predictor_run != 1 ) { | |
| 1220 if( palette_predictor_run > 1 ) | |
| predictorEntryIdx += palette_predictor_run − 1 | |
| PalettePredictorEntryReuseFlags[ predictorEntryIdx ] = 1 | |
| NumPredictedPaletteEntries++ | |
| 1230 { } else | |
| palettePredictionFinished = 1 | |
| } | |
| if( NumPredictedPaletteEntries < maxNumPaletteEntries ) | |
| num_signalled_palette_entries | ae(v) |
| for( cIdx = startComp; cIdx < ( startComp + numComps ); cIdx++ ) | |
| for( i = 0; i < num_signalled_palette_entries; i++ ) | |
| new_palette_entries[ cIdx ][ i ] | ae(v) |
| ... | |

FIG. 13

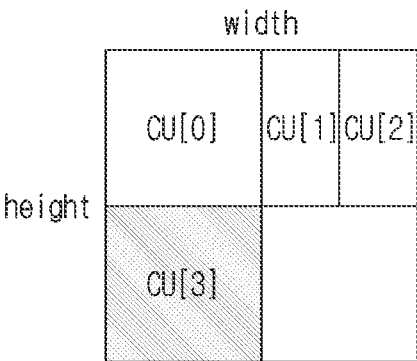

Predictor palette entries
(PredictorPaletteSize[startComp]==7)          PredPLT

| index | 0 | 1 | 2 | 3 | 4 | 5 | 6 | 7 | 8 | ··· | 60 | 61 | 62 |
|-------|-----|-----|-----|-----|-----|-----|-----|---|---|-----|----|----|----|
| Y | 102 | 84 | 549 | 843 | 345 | 62 | 994 | | | | | | |
| Cb | 102 | 84 | 549 | 102 | 84 | 549 | 102 | | | | | | |
| Cr | 345 | 62 | 994 | 345 | 62 | 994 | 345 | | | | | | | palette_predictor_run
0(indicate entry index 0) -> 3(indicate entry index 3)
  -> 2(indicate entry index 5) -> 1(termination)

FIG. 14

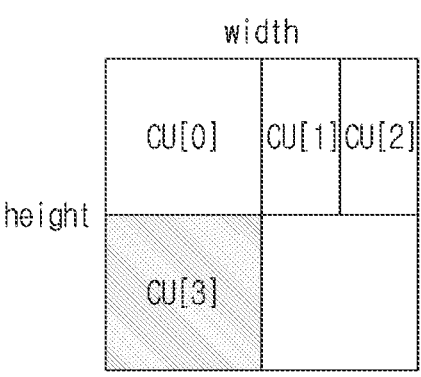

Predictor palette entries
(PredictorPaletteSize[startComp]==7)          PredPLT

| index | 0 | 1 | 2 | 3 | 4 | 5 | 6 | 7 | 8 | ··· | 60 | 61 | 62 |
|-------|-----|-----|-----|-----|-----|-----|-----|---|---|-----|----|----|----|
| Y | 102 | 84 | 549 | 843 | 345 | 62 | 994 | | | | | | |
| Cb | 102 | 84 | 549 | 102 | 84 | 549 | 102 | | | | | | |
| Cr | 345 | 62 | 994 | 345 | 62 | 994 | 345 | | | | | | | palette_predictor_run
0(indicate entry index 0) -> 3(indicate entry index 3)
  -> 2(indicate entry index 5) -> 0(indicate entry index 6)
    -> 1(termination)

FIG. 15

| palette_coding( x0, y0, cbWidth, cbHeight, treeType ) { | Descriptor |
|---|---|
| startComp = ( treeType == DUAL_TREE_CHROMA ) ? 1 : 0 | |
| numComps = ( treeType == SINGLE_TREE ) ? ( ChromaArrayType == 0 ? 1 : 3 ) : <br>     ( treeType == DUAL_TREE_CHROMA ) ? 2 : 1 | |
| maxNumPaletteEntries = ( treeType == SINGLE_TREE ) ? 31 : 15 | |
| palettePredictionFinished = 0 | |
| NumPredictedPaletteEntries = 0 | |
| num_predictor_palette_entries | ae(v) |
| for( predictorEntryIdx = 0; predictorEntryIdx < numPredictorPaletteEntries && <br>     !palettePredictionFinished && <br>     NumPredictedPaletteEntries < maxNumPaletteEntries; predictorEntryIdx++ ) { | |
|    palette_predictor_run | ae(v) |
|    if( palette_predictor_run != 1 ) { | |
|      if( palette_predictor_run > 1 ) | |
|       predictorEntryIdx += palette_predictor_run − 1 | |
|      PalettePredictorEntryReuseFlags[ predictorEntryIdx ] = 1 | |
|      NumPredictedPaletteEntries++ | |
|    } else | |
|      palettePredictionFinished = 1 | |
|    } | |
| } | |
| ... | |
| if( NumPredictedPaletteEntries < maxNumPaletteEntries ) | |
|    num_signalled_palette_entries | ae(v) |
| for( cIdx = startComp; cIdx < ( startComp + numComps ); cIdx++ ) | |
|    for( i = 0; i < num_signalled_palette_entries; i++ ) | |
|      new_palette_entries[ cIdx ][ i ] | ae(v) |
| ... | |

1510 { (bracket spanning the for loop section)

1520 ~ (pointing to the if section)

FIG. 16

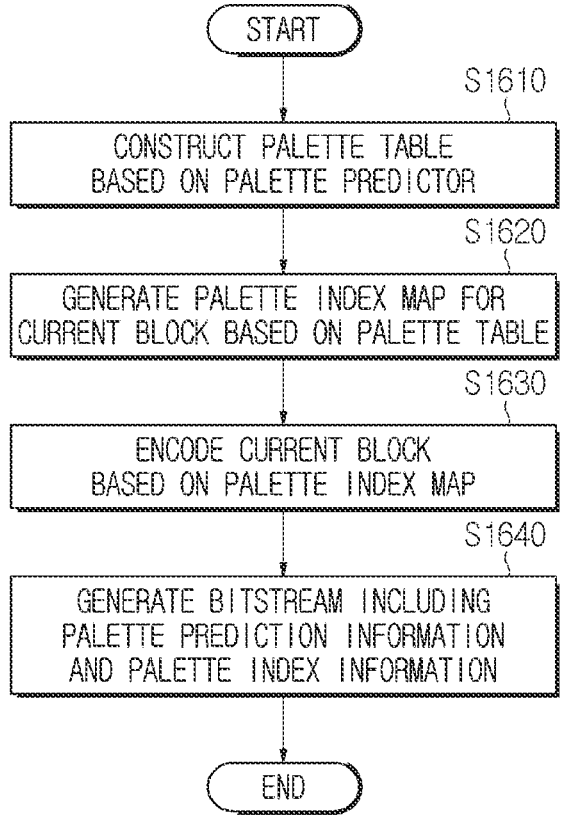

START

S1610 — CONSTRUCT PALETTE TABLE BASED ON PALETTE PREDICTOR

S1620 — GENERATE PALETTE INDEX MAP FOR CURRENT BLOCK BASED ON PALETTE TABLE

S1630 — ENCODE CURRENT BLOCK BASED ON PALETTE INDEX MAP

S1640 — GENERATE BITSTREAM INCLUDING PALETTE PREDICTION INFORMATION AND PALETTE INDEX INFORMATION

END

IMAGE ENCODING/DECODING METHOD AND APPARATUS BASED ON PALETTE MODE, AND RECORDING MEDIUM THAT STORES BITSTREAM

CROSS-REFERENCE TO RELATED APPLICATIONS

This application is a National Stage application under 35 U.S.C. § 371 of International Application No. PCT/KR2021/003432, filed on Mar. 19, 2021, which claims the benefit of U.S. Provisional Application No. 62/994,829, filed Mar. 25, 2020, and U.S. Provisional Application No. 62/992,139, filed Mar. 19, 2020. The disclosures of the prior applications are incorporated by reference in their entirety.

TECHNICAL FIELD

The present disclosure relates to an image encoding/decoding method and apparatus and a recording medium storing a bitstream, and more particularly, to an image encoding/decoding method and apparatus based on a palette mode and a recording medium storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency In addition, an object of the present disclosure is to provide an image encoding/decoding method and apparatus based on a palette mode.

In addition, an object of the present disclosure is to provide an image encoding/decoding method and apparatus based on run-value information of a reuse palette predictor.

In addition, an object of the present disclosure is to provide an image encoding/decoding method and apparatus for independently parsing run-value information of a reuse palette predictor.

In addition, an object of the present disclosure is to provide a computer-readable recording medium storing a bitstream generated by an image encoding method or apparatus according to the present disclosure.

In addition, an object of the present disclosure is to provide a computer-readable recording medium storing a bitstream received, decoded and used to reconstruct an image by an image decoding apparatus according to the present disclosure.

In addition, an object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

Technical Solution

An image encoding method according to an aspect of the present disclosure comprises obtaining palette prediction information and palette index information of a current block from a bitstream, constructing a palette table for the current block based on the palette prediction information, generating a palette index map for the current block based on the palette index information, and decoding the current block based on the palette table and the palette index map. The palette prediction information may comprise run-value information specifying a first palette entry reused in the palette table among palette entries in the palette predictor for the current block, the run-value information may be obtained from the bitstream only when an index value of the first palette entry is smaller than a first size of the palette predictor, and last run-value information of the palette predictor may have a first value for terminating search of the first palette entry, based on the first palette entry being a last reused palette entry in the palette table.

An image decoding apparatus according to another aspect of the present disclosure comprises a memory and at least one processor. The at least one process may obtain palette prediction information and palette index information of a current block from a bitstream, construct a palette table for the current block based on the palette prediction information, generate a palette index map for the current block based on the palette index information, and decode the current block based on the palette table and the palette index map. The palette prediction information may comprise nm-value information specifying a first palette entry reused in the palette table among palette entries in the palette predictor for the current block, the run-value information may be obtained from the bitstream only when an index value of the first palette entry is smaller than a first size of the palette predictor, and last run-value information of the palette predictor may have a first value for terminating search of the first palette entry, based on the first palette entry being a last reused palette entry in the palette table.

An image encoding method according to another aspect of the present disclosure comprises constructing a palette table for a current block based on a palette predictor for the current block, generating a palette index map for the current block based on the palette table; encoding the current block based on the palette index map, and generating a bitstream comprising palette prediction information and palette index information of the encoded current block. The palette prediction information may comprise run-value information specifying a first palette entry reused in the palette table among palette entries in the palette predictor for the current block, the run-value information may be encoded in the bitstream only when an index value of the first palette entry is smaller than a maximum size of the palette predictor, and last run-value information of the palette predictor may have a first value for terminating search of the first palette entry, based on the first palette entry being a last reused palette entry in the palette table.

A computer-readable recording medium according to yet another aspect of the present disclosure may store a bitstream generated by the image encoding method or the image encoding apparatus of the present disclosure.

A transmission method according to yet another aspect of the present disclosure may transmit a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide an image encoding/decoding method and apparatus based on a palette mode.

In addition, according to the present disclosure, it is possible to provide an image encoding/decoding method and apparatus based on run-value information of a reuse palette predictor.

In addition, according to the present disclosure, it is possible to provide an image encoding/decoding method and apparatus for independently parsing run-value information of a reuse palette predictor.

In addition, according to the present disclosure, it is possible to provide a recording medium storing a bitstream generated by an image encoding method or apparatus according to the present disclosure.

In addition, according to the present disclosure, it is possible to provide a recording medium storing a bitstream received, decoded and used to reconstruct an image by an image decoding apparatus according to the present disclosure.

In addition, according to the present disclosure, it is possible to provide a method for transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 7 is a view illustrating an example of coding_unit syntax.

FIG. 8 is a view illustrating an example of palette_coding syntax.

FIGS. 9 to 11 are views illustrating an example of an encoding/decoding process of palette_predictor_run.

FIG. 12 is a view illustrating palette_coding syntax according to an embodiment of the present disclosure.

FIGS. 13 and 14 are views illustrating an example of a process of encoding/decoding palette_predictor_run according to an embodiment of the present disclosure.

FIG. 15 is a view illustrating palette_coding syntax according to an embodiment of the present disclosure.

FIG. 16 is a flowchart illustrating an image encoding method according to an embodiment of the present disclosure.

MODE FOR INVENTION

Figure 1:
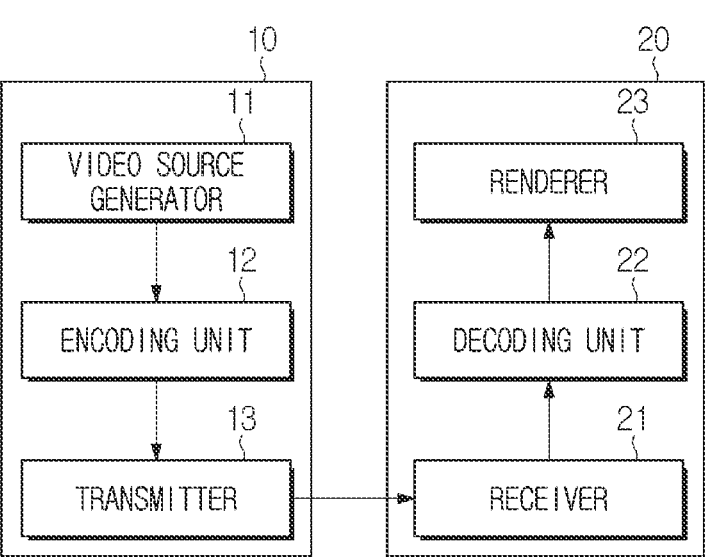
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array". "block" or "area" in some cases. In a general case, an M×N block may include samples (or sample arrays) or a set (or array) of transform coefficients of M columns and N rows.

In the present disclosure. "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
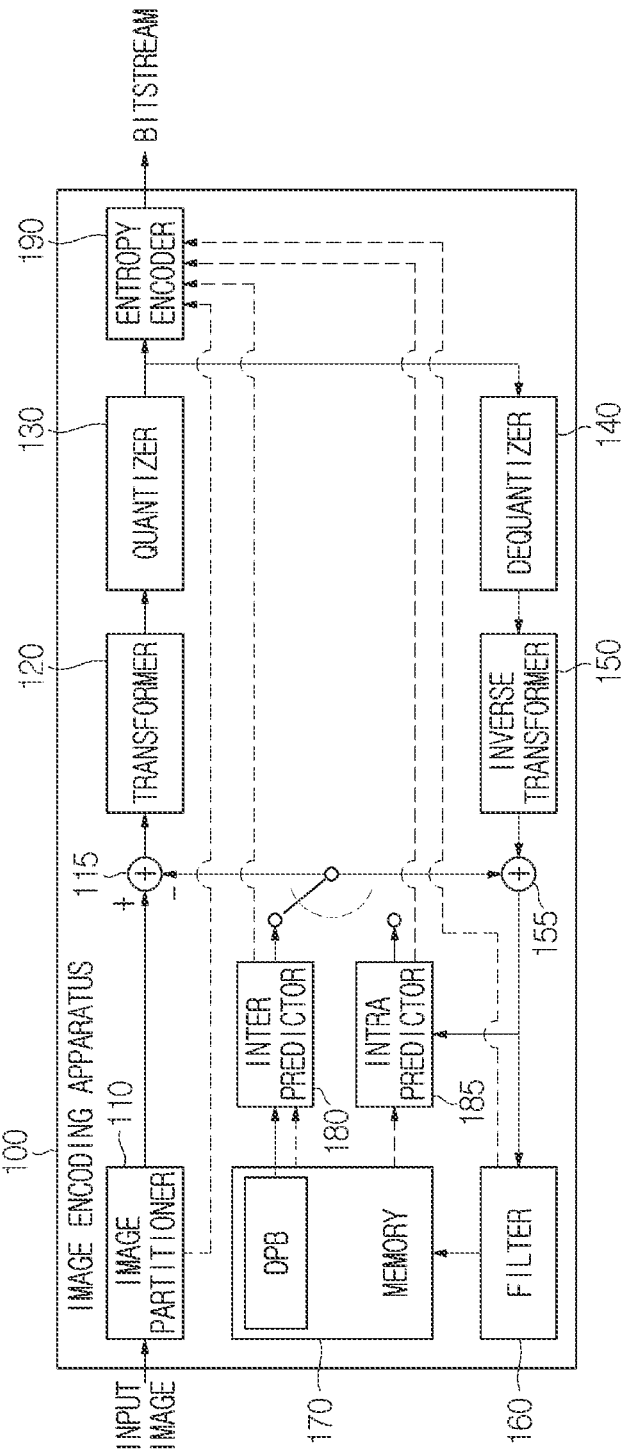
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
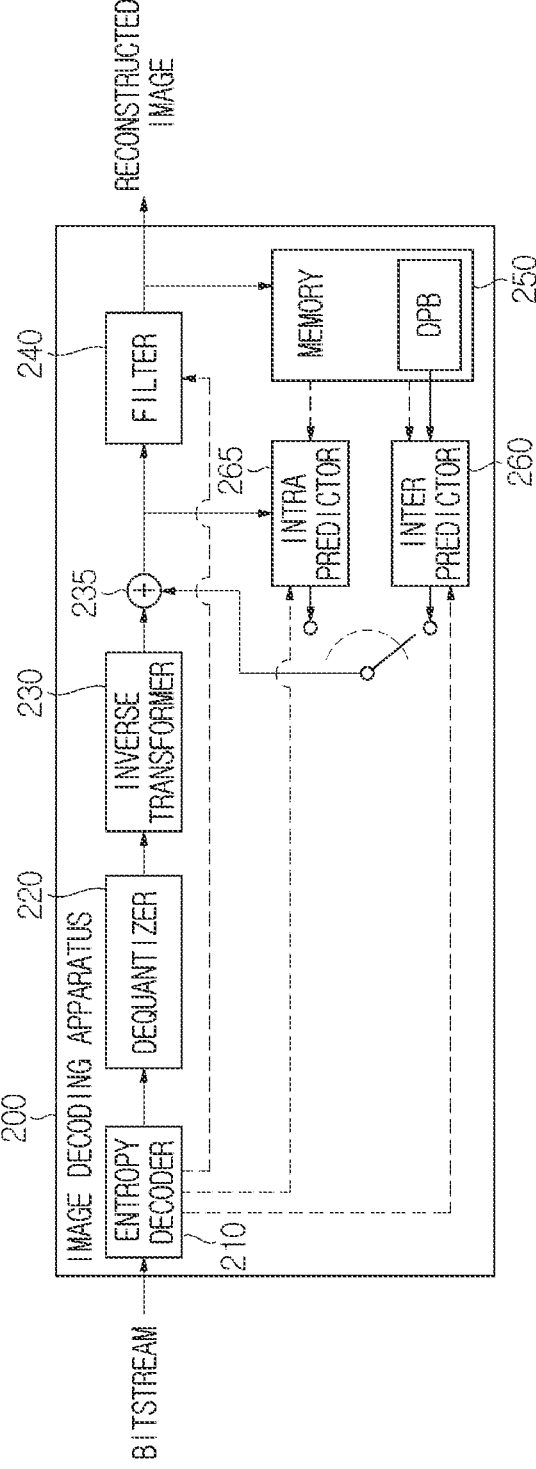
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor)

according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/ picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Hereinafter, a palette mode will be described.

Overview of Palette Mode

A palette mode refers to a prediction mode in which a current block is encoded/decoded based on a palette (or palette table) including a predetermined representative color value set. The palette mode is a type of intra prediction mode, and may be similar to a skip mode in that a residual value for a current block is not separately signaled. The palette mode may be referred to as a palette coding mode, an intra palette mode, an intra palette coding mode, or the like. In the present disclosure, encoding/decoding using a palette mode may be referred to as palette encoding/decoding.

The palette mode may be particularly effective for encoding/decoding screen content. Specifically, the screen content is an image including a significant amount of text and graphics, and may include a local area separated by a sharp edge. In this case, the local area may be represented by a relatively small number of sample values. Therefore, the palette mode, which expresses most sample values in the current block with a relatively small number of indices, may be more effective for encoding/decoding screen content than other prediction modes (e.g., intra prediction mode, inter prediction mode, etc.).

In the VVC standard, when the current chroma format is YUV 4:4:4, sps_palette_enabled_flag specifying whether the palette mode is available for a coded layer video sequence (CLVS) may be signaled. When the palette mode is available (e.g., sps_palette_enabled_flag=1), pred_ mode_plt_flag specifying whether the current block (or CU) is coded in the palette mode may be signaled.

When the palette mode is applied to the current block, sample values in the current block may be represented by a small set of predetermined representative color values. This set is called a pallet table. For a sample having a sample value close to representative color values of the palette table, a palette index may be signaled. In contrast, for a sample that is out of the representative color values of the palette table, a quantized sample value and an escape symbol for specifying the sample may be signaled. In order to specify whether an escape symbol is present in the current block, an escape flag may be signaled for each block. When an escape symbol is present in the current block, the palette table increases by 1, and the last palette index in the palette table may be assigned to the escape symbol.

Figure 4:
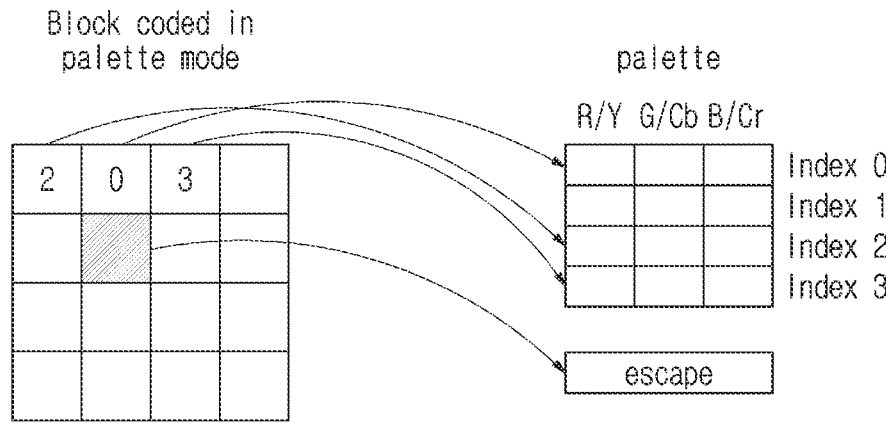
FIG. 4 is a view illustrating an example of a block coded in a palette mode.

FIG. 4 is a view illustrating an example of a block coded in a palette mode.

Referring to FIG. 4, a plurality of samples 411 to 414 in a block 410 may be coded based on a palette table 430. For example, the sample value of the first sample 411 may be coded as 3, which is a palette index value specifying a third representative color value in the palette table 430. In addition, the sample value of the second sample 412 may be coded as 0, which is a palette index value specifying the first representative color value in the palette table 430. In addition, the sample value of the third sample 413 may be coded as 3, which is a palette index value specifying a fourth representative color value in the palette table 430. In contrast, for the fourth sample 414 that is out of the representative color values of the palette table 430, the quantized sample value of the fourth sample 414 may be coded.

On the other hand, for palette entry coding, a palette predictor may be maintained. The palette predictor may include one or more palette entries (representative color values) and one or more palette indices for identifying the palette entries. The palette predictor may be initialized to a predetermined value at a (coding) start point of each slice, tile, brick or block. For example, in a sequential coding process (e.g., non-wavefront case), the palette predictor may be initialized to 0 at a (coding) start point of each slice. Alternatively, in a parallel coding process (e.g., wavefront case), the palette predictor may be initialized to 0 at a (coding) start point of each CTU. Information on the maximum size of the palette table and the palette predictor may be signaled in a sequence parameter set (SPS).

Then, a palette table may be constructed based on the palette predictor. To this end, a reuse flag specifying whether each palette entry in the palette predictor is included in the palette table may be signaled. In this case, the reuse flag having a first value (e.g., 0) may specify that the palette entry is not included in the palette table. In contrast, the reuse flag having a second value (e.g., 1) may specify that the corresponding palette entry is included in the palette table. In an example, the reuse flag may be encoded, for example, using run-length coding for a value of 0.

After the current block is palette-coded, the palette predictor may be updated based on the palette table. Palette entries in an old palette predictor that are not reused in the palette table may be added to the rear of a new palette predictor until the maximum allowable size of the palette predictor is reached. This is called pallet stuffing.

Based on the palette table, a palette index map for the current block to be encoded may be generated. Specifically, based on similarity between a sample value of each of a plurality of samples in the current block and a representative color value, by mapping a predetermined palette index in the palette table to each of the plurality of samples, the palette index map for the current block may be generated. In this case, an escape palette index may be mapped to a sample (escape sample) having a pixel which is not similar to the representative color value (palette entry) defined in the palette table among the plurality of samples in the current block. The escape palette index may specify an escape sample (escape symbol) and may have the largest value within the palette table. In order to specify whether the current block includes an escape sample, an escape sample flag (e.g., palette_escape_val_present_flag) may be signaled. For example, palette_escape_val_present_flag having a first value (e.g., 0) may specify that the current block does not include the escape sample. In contrast, palette_escape_val_present_flag having a second value (e.g., 1) may specify that the current block includes the escape sample.

When the current block is palette-coded, information (palette index information) on the palette index map may be signaled. The palette index information may include at least one palette index mapped to the current block and run-value information of the palette index. The run-value of the palette index may specify a value obtained by subtracting 1 from the number of palette indices continuously mapped to the current block as the same value. For example, when the current block includes first to fourth samples continuously present in a predetermined scan direction (e.g., horizontal direction), Palette index 0 is mapped to each of the first to third samples and Palette index 1 is mapped to the fourth sample, the run-value of Palette index 0 may be 2, and the run-value of Palette index 1 may be 0. When the current block includes the escape sample (e.g., palette_escape_val_present_flag==1), the palette index information may include run-value information of the escape palette index mapped to the escape sample.

Based on the palette index information, a palette index map for the current block to be encoded may be generated. For example, by mapping each of one or more palette indices obtained from the palette index information to each of the plurality of samples in the current block, the palette index map for the current block may be generated. In an example, based on a last palette index (in mapping order) among one or more palette indices obtained from the palette index information, the value of each of the one or more palette indices may be adjusted. For example, when the last palette index obtained from the palette index information is an escape palette index, palette entries obtained from the palette index information may be mapped to the current block as a value increasing by a predetermined size (e.g., 1).

The palette indices mapped to the current block may be encoded/decoded using a predetermined scan method.

Figure 5:
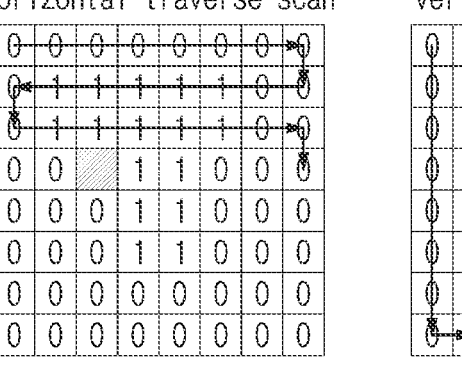
FIG. 5 is a view illustrating an example of a scan method which may be used in a palette mode.

FIG. 5 is a view illustrating an example of a scan method for palette encoding/decoding.

Referring to FIG. 5, palette indices mapped to a current block may be encoded/decoded using horizontal traverse scan and vertical traverse scan.

The horizontal traverse scan may mean a method in which an odd-numbered row of the current block (or palette index map) is scanned from left to right and an even-numbered row of the current block is scanned from right to left. In addition, the vertical traverse scan may mean a method in which an odd-numbered column of the current block is scanned from top to bottom and an even-numbered column of the current block is scanned from bottom to top.

Information on a scan method for palette encoding/decoding may be signaled using a predetermined flag (e.g., palette_transpose_flag). For example, when palette_transpose_flag has a first value (e.g., 0), horizontal traverse scan may be applied to scan palette indices mapped to the current block. In contrast, when palette_transpose_flag has a second value (e.g., 1), vertical traverse scan may be applied to scan palette indices mapped to the current block.

The palette indices mapped to the current block may be encoded/decoded in a predetermined palette sample mode, for example, INDEX mode or COPY_ABOVE mode.

In the INDEX mode, the value of the palette index may be explicitly signaled. In contrast, in the COPY_ABOVE mode, the value of the palette index may not be explicitly signaled. In this case, the value of the corresponding palette index is determined (or copied) to be the same value as the value of the palette index that is present at the same location in the immediately upper row in the case of horizontal traverse scan, and may be determined (or copied) to be the same value as the value of the palette index present at the same location in the immediately left column in the case of vertical traverse scan.

Information on the palette sample mode may be signaled using a predetermined flag (e.g., copy_above_palette_indices_flag). For example, when copy_above_palette_indices_flag has a first value (e.g., 0), the INDEX mode may be applied to the corresponding palette index. In contrast, when copy_above_palette_indices_flag has a second value (e.g., 1), the COPY_ABOVE mode may be applied to the corresponding palette index. When copy_above_palette_indices_flag is not signaled, the value of copy_above_palette_indices_flag may be inferred to be a first value (e.g., 0). On the other hand, when the palette sample mode of the samples belonging to the uppermost row of the current block and the previous (encoded/decoded) sample is the COPY_ABOVE mode, copy_above_palette_indices_flag may not be signaled. In addition, run-value information specifying the number of consecutively encoded samples using the same palette sample mode may be signaled.

Figure 6:
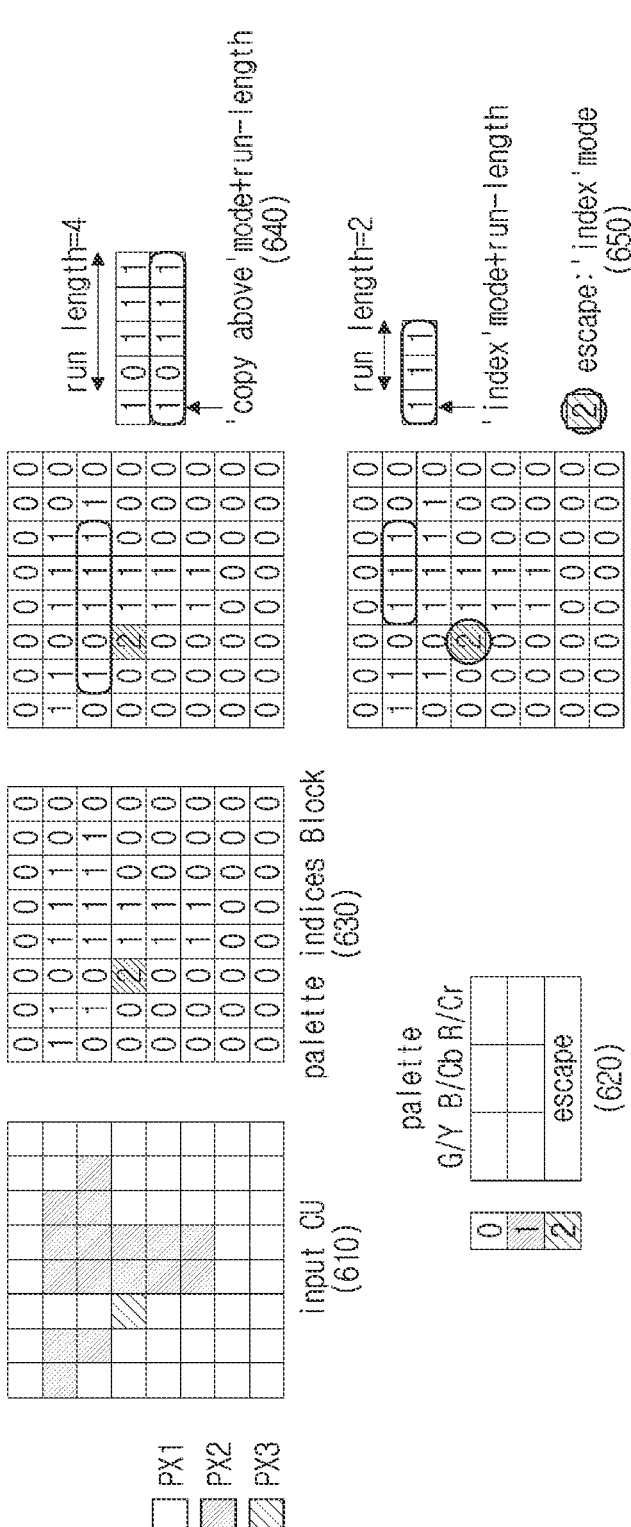
FIG. 6 is a view illustrating a palette coding process of a current block.

FIG. 6 is a view illustrating a palette coding process of a current block.

Referring to FIG. 6, first samples PX1 in a current block may have a first color value, second samples PX2 may have a second color value, and a third sample PX3 may have a third color value (610).

When the palette mode is applied to the current block, a palette table for the current block may be constructed (620). The palette table may include palette entries (representative color values) and palette indices (e.g., 0, 1) respectively specifying the palette entries. In this case, palette index 0 may indicate a palette entry of a first color value, and palette index 1 may indicate a palette entry of a second color value. In addition, the palette table may further include an escape palette index (e.g., 2). In this case, palette index 2 may indicate an escape symbol.

Based on the palette table, a palette index map of the current block may be generated (630). For example, palette index 0 may be mapped to the first samples PX1, palette index 1 may be mapped to the second samples PX2 and palette index 2 may be mapped to the third sample PX3, which is an escape symbol, thereby generating a palette index map for the current block.

In addition, by scanning the palette index map according to a predetermined scan method, the palette sample mode and the run-value of the palette sample mode may be derived (640, 650). For example, since palette indices '1, 0, 1, 1, 1' continuously mapped to the third row of the palette index map have the same values as the palette indices present at the same location in the second row of the palette index map, they may be coded in the COPY_ABOVE mode, respectively. In this case, the run-value of the palette sample mode may be determined to be 4 (640). In contrast, since the palette indices '1, 1, 1' continuously mapped to the second row of the palette index map have values different from those of the palette indices present at the same location in the first row of the palette index map, they may be coded in INDEX mode. In this case, the run-value of the palette sample mode may be determined to be 2 (650). On the other hand, palette index 2, which is an escape palette index, may be encoded in INDEX mode. In this case, the quantized sample value (i.e., the third color value) of the third sample PX3 mapped to the palette index 2 may be directly coded.

As such, when the palette mode is applied to the current block, a predetermined palette index in the palette table is mapped to each of a plurality of samples in the current block to construct a palette index map, and the palette index included in the palette index map may be coded in INDEX mode or COPY_ABOVE mode according to a predetermined scan method.

Syntax Elements Related to Palette Mode

FIG. 7 is a view illustrating an example of coding_unit syntax.

Referring to FIG. 7, the coding_unit syntax may include pred_mode_plt_flag as a syntax element related to the palette mode.

The syntax element pred_mode_plt_flag may specify whether the palette mode is applied to the current block. For example, pred_mode_plt_flag having a first value (e.g., 0) may specify that the palette mode is not applied to the current block. In contrast, pred_mode_plt_flag having the second value (e.g., 1) may specify that the palette mode is applied to the current block. When pred_mode_plt_flag is not signaled, the value of pred_mode_plt_flag may be inferred to be a first value (e.g., 0).

When the palette mode is applied to the current block (e.g., pred_mode_plt_flag=1), the palette coding syntax may be called. Specifically, when the tree type (treeType) of the current block is single tree (SINGLE_TREE) or dual tree luma (DUAL_TREE_LUMA), Palette_coding syntax may be called with the luma component width cbWidth and height cbHeight of the current block as input values (710). Also, when the tree type (treeType) of the current block is dual tree chroma (DUAL_TREE_CHROMA), the palette_coding syntax may be called with the chroma component width (cbWidth/SubWidthC) and height (cbHeight/SubHeightC) of the current block as input values (720).

FIG. 8 is a view illustrating an example of palette_coding syntax.

Referring to FIG. 8, the palette_coding syntax may include palette_predictor_run, num_signalled_palette_entries, and new_palette_entries as syntax elements related to the palette predictor.

The syntax element palette_predictor_run may be used to determine the number of zero entries (i.e., non-reuse palette entries) preceding a non-zero entry (i.e., a reuse palette entry) in an array PalettePredictorEntryReuseFlags. In this case, PalettePredictorEntryReuseFlags[i], which is each element of the array PalettePredictorEntryReuseFlags, may specify whether each palette entry in the palette predictor is reused in the palette table (or the current palette). For example, PalettePredictorEntryReuseFlags[i] having a first value (e.g., 0) may specify that an i-th palette entry is not reused in the palette table. In contrast, PalettePredictorEntryReuseFlags[i] having the second value (e.g., 1) may specify that the i-th palette entry is reused in the palette table. In an example, all elements of the PalettePredictorEntryReuseFlags array may be initialized to a first value (e.g., 0).

In an example, the value of palette_predictor_run may be limited to be within a range from 0 to (PredictorPaletteSize[startComp]−predictorEntryIdx), inclusive, in order to satisfy bitstream conformance. Here, PredictorPaletteSize[startComp] may specify the size of the palette predictor for a first color component (startComp) of the palette table. predictorEntryIdx may correspond to the current position in the array PalettePredictorEntryReuseFlags. Meanwhile, a variable NumPredictedPaletteEntries may specify the number of palette entries in the palette table reused from the palette predictor. In an example, the value of NumPredictedPaletteEntries may be limited to be within a range from 0 to a variable maxNumPaletteEntries, inclusive. Here, the variable maxNumPaletteEntries may specify the maximum size of the palette table. In an example, maxNumPaletteEntries may be 31 if the tree type (treeType) of the current block is a single tree (SINGLE_TREE), and may be 15 if the tree type (treeType) of the current block is not a single tree (SINGLE_TREE).

The syntax element num_signalled_palette_entries may specify the number of palette entries in the palette table that are explicitly signaled for the first color component (startComp) of the palette table. When num_signalled_palette_entries is not present (i.e., is not signaled), the value of num_signalled_palette_entries may be inferred to be a first value (e.g., 0).

Based on the value of num_signalled_palette_entries, a variable CurrentPaletteSize[startComp] specifying the size of the palette table for the first color component (startComp) in the palette table may be derived as shown in Equation 1 below.

$$\text{CurrentPaletteSize[startComp]=NumPredictedPaletteEntries+num\_signalled\_palette\_entries} \quad \text{[Equation 1]}$$

In an example, the value of CurrentPaletteSize[startComp] may be limited to be within a range from 0 to maxNumPaletteEntries, inclusive. That is, maxNumPaletteEntries may specify the maximum value of CurrentPaletteSize[startComp].

A syntax element new_palette_entries[cIdx][i] may specify the value of the i-th signaled (new) palette entry for a specific color component (cIdx).

A variable PredictorPaletteEntries[cIdx][i] may specify the i-th element (i.e., palette entry) in the palette predictor for a specific color component (cIdx).

A variable CurrentPaletteEntries[cIdx][i] may specify the i-th element (i.e., palette entry) in the palette table for a specific color component (cIdx), and may be derived as shown in Table 1 below.

TABLE 1

| Current palette (palette table) derivation process |
| --- |
| The variable CurrentPaletteEntries[ cIdx ][ i ] specifies the i-th element in the current palette for the colour component cIdx and is derived as follows: numPredictedPaletteEntries = 0 for( i = 0; i < PredictorPaletteSize[ startComp ]; i++ ) if( PalettePredictorEntryReuseFlags[ i ] ) { for( cIdx =startComp; cIdx < ( startComp + numComps ); cIdx++ ) CurrentPaletteEntries[ cIdx ][ numPredictedPaletteEntries ] = PredictorPaletteEntries[ cIdx ][ i ] numPredictedPaletteEntries++ } for( cIdx = startComp; cIdx < (startComp + numComps); cIdx++) |

TABLE 1-continued

Current palette (palette table) derivation process

```
for( i = 0; i < num_signalled_palette_entries[startComp]; i++ )
    CurrentPaletteEntries[ cIdx ][ numPredictedPaletteEntries + i ] =
new_palette_entries[ cIdx ][ i ]
```

Referring to Table 1, the palette table (CurrentPaletteEntries[cIdx][i]) may be constructed to include a reused palette entry (PredictorPaletteEntries[cIdx][i]) and a signaled (new) palette entry (new_palette_entries[cIdx])[i]) from the palette predictor. In addition, a variable PredictorPaletteSize[startComp] specifying the size of the palette predictor may be used to derive a variable CurrentPaletteEntries[cIdx][i].

Meanwhile, the variable PredictorPaletteSize[startComp] specifying the size of the palette predictor and the array PredictorPaletteEntries specifying the palette predictor may be derived/modified (updated) as shown in Table 2 below.

TABLE 2

Palette predictor derivation or modification process

```
When one of the following conditions is true:
-  cIdx is equal to 0 and numComps is equal to 1;
-  cIdx is equal to 2;
the value PredictorPaletteSize[ startComp ] and the array PredictorPaletteEntries are
derived or modified as follows:
for( i = 0; i < CurrentPaletteSize[ startComp ]; i++ )
    for( cIdx = startComp; cIdx < (startComp + numComps); cIdx++ )
        newPredictorPaletteEntries[ cIdx ][ i ] = CurrentPaletteEntries[ cIdx ][ i ]
newPredictorPaletteSize = CurrentPaletteSize[ startComp ]
for( i = 0; i < PredictorPaletteSize[ startComp ] && newPredictorPaletteSize <
maxNumPalettePredictorSize; i++ )
    if( !PalettePredictorEntryReuseFlags[ i ] ) {
        for( cIdx = startComp; cIdx < (startComp + numComps); cIdx++ )
            newPredictorPaletteEntries[ cIdx ][ newPredictorPaletteSize ] =
                PredictorPaletteEntries[ cIdx ][ i ]
        newPredictorPaletteSize++
    }
for( cIdx = startComp; cIdx < ( startComp + numComps ); cIdx++ )
    for( i = 0; i < newPredictorPaletteSize; i++ )
        PredictorPaletteEntries[ cIdx ][ i ] = newPredictorPaletteEntries[ cIdx ][ i ]
    PredictorPaletteSize[ startComp ] = newPredictorPaletteSize
When qtbtt_dual_tree_intra_flag is equal to 0 or slice_type is not equal to I, the following
applies:
    PredictorPaletteSize[ 1 ] = newPredictorPaletteSize
```

In Table 2, the variable startComp specifies the first color component in the palette table, the variable numComps specifies the number of color components in the palette table, and the variable maxNumPalettePredictorSize may specify the maximum allowable size of the palette predictor. The variables may be determined according to the following conditions based on the tree type (treeType) of the current block.

(Condition 1) When the tree type (treeType) of the current block is a single tree (SINGLE_TREE), the variable startComp is set to 0 (i.e., luma component). In addition, the variable numComps is set to 1 when the chroma format of the current block is monochrome or a separate 4:4:4 format (e.g., ChromaArrayType=0), and, otherwise (e.g., ChromaArrayType=0), is set to 0. Also, the variable maxNumPalettePredictorSize is set to 63.

(Condition 2) When the tree type (treeType) of the current block is dual tree luma (DUAL_TREE_LUMA), the variable startComp is set to 0 (that is, the luma component), the variable numComps is set to 1, and the variable maxNumPalettePredictorSize is set to 31.

(Condition 3) If the tree type (treeType) of the current block is dual tree chroma (DUAL_TREE_CHROMA), the variable startComp is set to 1 (that is, the first chroma component), the variable numComps is set to 2, the variable maxNumPalettePredictorSize set to 31.

Referring to Table 2, the variable PredictorPaletteSize[startComp] and the array PredictorPaletteEntries may be derived/modified (updated) only when the variable cIdx is 0 and the variable numComps is 1, or the variable cIdx is 2.

Meanwhile, a variable PredictorPaletteSize[startComp] specifying the size of the palette predictor derived/modified (updated) through the process of Table 2 may be included in the parsing condition of the syntax element palette_predictor_run (810). Specifically, palette_predictor_run may be signaled/parsed only when the variable predictorEntryIdx is smaller than PredictorPaletteSize[startComp]. Here, predictorEntryIdx corresponds to the current position in the array PalettePredictorEntryReuseFlags, and may have an index value of each palette entry in the palette predictor reused in the palette table. An example of a process of decoding palette_predictor_run based on the method of Table 2 is shown in FIGS. 9 to 11.

Figures 9, 10:
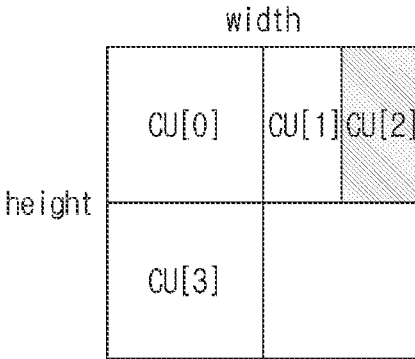

FIGS. 9 to 11 are views illustrating an example of an encoding/decoding process of palette_predictor_run.

First, referring to FIG. 9, when a third CU (CU[2]) in a CTU is palette-encoded/decoded, through the process of Table 2 described above, the palette predictor (PredPLT) having a maximum palette size of 63 may be constructed. The palette predictor may include seven palette entries (indices 0 to 6), and each palette entry may have a predetermined representative color value for each color component (Y, Cb, Cr).

In addition, when a fourth CU (CU[3]) in the CTU is palette-encoded/decoded, the palette table (or the current palette) for the fourth CU (CU[3]) may be constructed from the palette predictor PredPLT constructed as the encoding/decoding result of the third CU (CU[2]). That is, at least one of the palette entries included in the palette predictor may be reused in the palette table.

FIG. 10 illustrates a case where palette entries of indices 0, 3 and 5 in a palette predictor PredPLT are reused in a palette table.

Referring to FIG. 10, in an encoding stage, a syntax element palette_predictor_run (see FIG. 8) may be signaled to specify three palette entries (indices 0, 3, and 5) that are reused in the palette table. have. For example, in order to specify the palette entry of index 0, palette_predictor_run having a value of 0 may be signaled. Next, in order to specify the palette entry of index 3, palette_predictor_run having a value of 3 may be signaled. Next, in order to specify the palette entry of index 5, palette_predictor_run having a value of 2 may be signaled. Since the palette entry of index 5 is not the last palette entry in the palette predictor PredPLT, a termination indicator specifying that there are no more reused palette entries in the palette predictor PredPLT needs to be signaled. Accordingly, as the termination indicator, palette_predictor_run having a value of 1 may be additionally signaled. In this case, in a decoding stage, since the parsing operation of palette_predictor_run may be terminated based on whether the value of palette_predictor_run is 1 or not, a parsing dependency on PredictorPaletteSize [startComp], which is the previous palette encoding/decoding result, does not occur.

FIG. 11 illustrates a case where palette entries of indices 0, 3, 5 and 6 in a palette predictor PredPLT are reused in a palette table.

Referring to FIG. 11, in an encoding stage, a syntax element palette_predictor_run (see FIG. 8) may be signaled to specify four palette entries (indices 0, 3, 5, and 6) reused in a palette table. For example, in order to specify the palette entry of index 0, palette_predictor_run having a value of 0 may be signaled. Next, in order to specify the palette entry of index 3, palette_predictor_run having a value of 3 may be signaled. Next, in order to specify the palette entry of index 5, palette_predictor_run having a value of 2 may be signaled. Next, in order to specify the palette entry of index 6, palette_predictor_run having a value of 0 may be signaled. Since the palette entry of index 6 is the last palette entry in the palette predictor PredPLT, a termination indicator specifying that there are no more reused palette entries in the palette predictor PredPLT may not be signaled separately. In this case, in a decoding stage, PredictorPaletteSize[start-Comp], which is the previous palette encoding/decoding result, shall be referred to in order to terminate the parsing operation of palette_predictor_run, and, in this process, a parsing dependency may occur.

As such, as the variable PredictorPaletteSize[startComp] specifying the size of the palette predictor is included in the parsing condition of the syntax element palette_predictor_run, parsing dependency that depends on the previous palette decoding result in the parsing stage of the palette coding syntax may occur. Accordingly, there may be a problem in that the throughput and efficiency of the encoding/decoding apparatus are deteriorated.

In order to solve the above problem, according to embodiments of the present disclosure, the syntax element palette_predictor_run is decoded based on the maximum (allowable) size of the palette predictor, and a predetermined termination indicator (e.g., palette_predictor_run having a value of 1) may be signaled without condition. Alternatively, the syntax element palette_predictor_run may be decoded based on the size of the palette predictor, and a predetermined termination indicator (e.g., palette_predictor_run having a value of 1) may be signaled without condition. Alternatively, the syntax element palette_predictor_run may be decoded based on the size of the explicitly signaled palette predictor.

Hereinafter, embodiments of the present disclosure will be described in detail.

Embodiment 1

According to Embodiment 1 of the present disclosure, a syntax element palette_predictor_run for specifying a reuse palette entry in a palette predictor may be decoded based on a variable maxNumPalettePredictorSize specifying a maximum (allowable) size of the palette predictor.

FIG. 12 is a view illustrating palette_coding syntax according to an embodiment of the present disclosure. As described above with reference to FIG. 7, when a palette mode is applied to a current block (e.g., pred_mode_plt_flag=1), the palette_coding syntax may be called.

Referring to FIG. 12, the variable maxNumPalettePredictorSize specifies the maximum (allowable) size of the palette predictor, and may be set to a predetermined value based on whether the tree type (treeType) of the current block is a single tree (SINGLE_TREE). For example, when the tree type (treeType) of the current block is a single tree (SINGLE_TREE), maxNumPalettePredictorSize may be set to 31. On the contrary, when the tree type (treeType) of the current block is not a single tree (SINGLE_TREE), maxNumPalettePredictorSize may be set to 15.

In an embodiment, maxNumPalettePredictorSize may be set to a predetermined value based on a predetermined flag (e.g., qtbtt_dual_tree_intra_flag) specifying the split structure of a current CTU. For example, when qtbtt_dual_tree_intra_flag has a first value (e.g., 0), maxNumPalettePredictorSize may be set to 63. In this case, qtbtt_dual_tree_intra_flag having a first value (e.g., 0) may specify that the current block is included in an I slice and the CTU included in the slice is split into a single tree structure. In contrast, when qtbtt_dual_tree_intra_flag has a second value (e.g., 1), maxNumPalettePredictorSize may be set to 31. At this time, qtbtt_dual_tree_intra_flag having a second value (e.g., 1) may specify that the current block is included in the I slice, a CTU included in the slice is implicit-quadtree-split into a 64×64 luma sample CU, and the 64×64 luma sample CU becomes a root node of a dual tree.

Meanwhile, based on maxNumPalettePredictorSize, a variable PredictorPaletteEntries[cIdx][i] specifying a palette entry in a palette predictor may be derived as shown in Table 3.

TABLE 3

The variable PredictorPaletteEntries[ cIdx ][ i ] specifies
the i-th element in the predictor
palette for the colour component cIdx and is derived as follows;.
for( i = 0; i < maxNumPalettePredictorSize; i++ )
  for( cIdx =startComp; cIdx < ( startComp + numComps ); cIdx++ )
    PredictorPaletteEntries [ cIdx ][ i ] = 1 << ( BitDepth − 1 )

In Table 3, a variable startComp specifies a first color component in the palette table, and may be set to 1 or 0 based on the tree type (treeType) of the current block. For example, when the tree type (treeType) of the current block is dual tree chroma (DUAL_TREE_CHROMA), startComp may be set to 1. On the contrary, when the tree type (treeType) of the current block is not dual tree chroma (DUAL_TREE_CHROMA), startComp may be set to 0.

Also, a variable numComps specifies the number of color components in the palette table, and may be set to 0 to 3 based on the tree type (treeType) and chroma array type (ChromaArrayType) of the current block. For example, when the tree type (treeType) of the current block is a single tree (SINGLE_TREE), if the chroma array type (ChromaArrayType) of the current block is 0 (i.e., monochrome format), numComps may be set to 1. In contrast, in this case, if the chroma array type (ChromaArrayType) of the current block is not 0 (i.e., 4:2:0, 4:2:2, or 4:4:4 chroma format), num-Comps may be set to 3. Alternatively, when the tree type (treeType) of the current block is dual tree chroma (DUAL_TREE_CHROMA), numComps may be set to 2. In contrast, when the tree type (treeType) of the current block is not dual tree chroma (DUAL_TREE_CHROMA), numComps may be set to 1.

Returning to FIG. 12 again, palette coding syntax may include palette_predictor_run, num_signalled_palette_entries, and new_palette_entries as syntax elements related to the palette predictor. Hereinafter, a description of the content overlapping with FIG. 8 will be omitted.

A syntax element palette_predictor_run may be used to determine the number of zero entries (i.e., non-reuse palette entries) preceding a non-zero entry (i.e., a reuse palette entry) in an array PalettePredictorEntryReuseFlags. In this case, PalettePredictorEntryReuseFlags[i], which is each element of the array PalettePredictorEntryReuseFlags, may specify whether each palette entry in the palette predictor is reused in a palette table (or a current palette). palette_predictor_run may be signaled/parsed only when a variable predictorEntryIdx is smaller than maxNumPalettePredictorSize (1210). Here, predictorEntryIdx corresponds to a current position in the array PalettePredictorEntryReuseFlags, and may have an index value of each palette entry in the palette predictor reused in the palette table. In one embodiment, predictorEntryIdx may be determined based on palette_predictor_run (1220). For example, only when the value of palette_predictor_run is greater than 1, the value of predictorEntryIdx may be updated to a value obtained by adding palette_predictor_run−1 to predictorEntryIdx.

Meanwhile, the bitstream constraint described above with reference to FIG. 8 may not be applied to palette_predictor_run of FIG. 12. That is, the value of palette_predictor_run may not be limited to be within the range of 0 to (PredictorPaletteSize[startComp]−predictorEntryIdx), inclusive.

A syntax element num_signalled_palette_entries may specify the number of palette entries in the palette table that are explicitly signaled for a first color component startComp of the palette table. When num_signalled_palette_entries is not present (i.e., is not signaled), the value of num_signalled_palette_entries may be inferred to be a first value (e.g., 0).

A variable CurrentPaletteSize[startComp] specifying the size of the palette table for the first color component startComp in the palette table may be derived based on num_signalled_palette_entries, and the specific method thereof is as described above with reference to Equation 1.

A syntax element new_palette_entries[cIdx][i] may specify the value of the i-th signaled (new) palette entry for a specific color component (cIdx).

A variable CurrentPaletteEntries[cIdx][i] may specify an i-th element (i.e., palette entry) in the palette table for a specific color component (cIdx), and may be derived by the method described above with reference to Table 1.

Meanwhile, a variable PredictorPaletteSize[startComp] specifying the size of the palette predictor and an array PredictorPaletteEntries specifying a palette predictor may be derived/modified (updated) by the method described above with reference to Table 2. However, it may be different from the method of Table 2 in that a variable maxNumPalettePredictorSize specifying a maximum (allowable) size of the palette predictor may be set to 63 or 31 based on a predetermined flag (e.g., qtbtt_dual_tree_intra_flag) specifying the split structure of the current CTU as described above.

Meanwhile, a variable PredictorPaletteSize[startComp] specifying the size of the palette predictor derived/modified (updated) through the process of Table 2 is not included in the parsing condition of the syntax element palette_predictor_run (1210). That is, palette_predictor_run may be decoded based on the variable maxNumPalettePredictorSize specifying the maximum (allowable) size of the palette predictor. As a result, when the palette entry specified by the variable predictorEntryIdx is not present in the palette predictor (i.e., predictorEntryIdx==PredictorPaletteSize[startComp]), unlike the case of FIG. 8 where signaling/parsing of palette_predictor_run is terminated without change, palette_predictor_run having a predetermined value (e.g., 1) may be signaled/parsed. In this case, palette_predictor_run having the predetermined value (e.g., 1) may function as a termination indicator for terminating the process of constructing the array PalettePredictorEntryReuseFlags (1230).

FIGS. 13 and 14 are views illustrating an example of a process of encoding/decoding palette_predictor_run according to an embodiment of the present disclosure. FIG. 13 corresponds to the example described above with reference to FIG. 10, and FIG. 14 corresponds to the example described above with reference to FIG. 11. Therefore, redundant descriptions will be omitted, and differences will be focused upon.

First, referring to FIG. 13, at an encoding stage, a syntax element palette_predictor_run (refer to FIG. 12) may be signaled to specify three palette entries (0, 3, and 5 indexes) that are reused in the palette table. For example, in order to specify the palette entry of index 0, palette_predictor_run having a value of 0 may be signaled. Next, in order to specify the palette entry of index 3, palette_predictor_run having a value of 3 may be signaled. Next, in order to specify the palette entry of index 5, palette_predictor_run having a value of 2 may be signaled.

On the other hand, since the palette entry of index 6 is not reused in the palette table (that is, since there are no more palette entries in the palette predictor (PredPLT)), palette_predictor_run having a value of 1 as a termination indicator may be additionally signaled.

Next, referring to FIG. 14, in the coding stage, a syntax element palette_predictor_run (see FIG. 12) to specify four palette entries (0, 3, 5, and 6 indexes) reused in the palette table refer may be signaled. For example, in order to specify the palette entry of index 0, palette_predictor_run having a value of 0 may be signaled. Next, in order to specify the palette entry of index 3, palette_predictor_run having a value of 3 may be signaled. Next, in order to specify the palette entry of index 5, palette_predictor_run having a value of 2 may be signaled. Next, in order to specify the palette entry of index 6, palette_predictor_run having a value of 0 may be signaled.

On the other hand, the palette entry of index 6 is the last palette entry in the palette predictor PredPLT, but palette_predictor_run is decoded based on the maximum (allowable) size of the palette predictor. Therefore, the termination indicator for terminating the decoding process needs to be signaled separately. Accordingly, palette_predictor_run having a value of 1 as a termination indicator may be additionally signaled.

As such, according to Embodiment 2 of the present disclosure, the termination indicator specifying that there are no more reused palette entries in the palette predictor PredPLT may be signaled regardless of whether the palette entry specified by the variable predictorEntryIdx is present in the palette predictor PredPLT. Accordingly, since, in a decoding stage, it is not necessary to refer to PredictorPaletteSize[startComp], which is the previous palette encoding/decoding result, in order to terminate the parsing operation of palette_predictor_run, parsing dependency does not occur, thereby further improving the throughput and efficiency of the decoding apparatus.

On the other hand, as a modification of Embodiment 2 of the present disclosure, the syntax element palette_predictor_run is decoded based on the variable PredictorPaletteSize[startComp] specifying the size of the palette predictor, but a predetermined termination indicator (e.g., palette_predictor_run having a value of 1) may be signaled without condition. In this case, the structure of the palette_coding syntax is as shown in FIG. 8, but, even when the last palette entry in the palette predictor (PredPLT) is reached, the parsing operation of palette_predictor_run may be terminated by the termination indicator, thereby removing the parsing dependency.

Embodiment 2

According to Embodiment 2 of the present disclosure, the syntax element palette_predictor_run for specifying a reuse palette entry in the palette predictor may be decoded based on the syntax element num_predictor_palette_entries specifying the size of the palette predictor.

FIG. 15 is a view illustrating palette_coding syntax according to an embodiment of the present disclosure. As described above with reference to FIG. 7, when a palette mode is applied to the current block (e.g., pred_mode_plt_flag=1), the palette coding syntax may be called.

Referring to FIG. 15, palette coding syntax may include num_predictor_palette_entries, palette_predictor_run, num_signalled_palette_entries, and new_palette_entries as syntax elements related to the palette predictor. Hereinafter, a description of the content overlapping with FIG. 8 will be omitted.

The syntax element num_predictor_palette_entries may specify the number of palette entries in the palette predictor (i.e., the size of the palette predictor). In the conventional case, the size of the palette predictor may be derived in the same manner as in Table 2 above, based on the previous palette encoding/decoding result. In addition, as the derived palette predictor size (PredictorPaletteSize[startComp]) configures the signaling/parsing condition of the syntax element palette_predictor_run, parsing dependency that depends on the previous palette encoding/decoding result in the decoding stage may occur. However, according to Embodiment 2 of the present disclosure, the size of the palette predictor may be derived by parsing separately signaled num_predictor_palette_entries. Therefore, regardless of whether the size of the derived palette predictor configures the signaling/parsing condition of the syntax element palette_predictor_run, it does not need to depend on the previous palette encoding/decoding result in the decoding stage, thereby removing the parsing dependency. Meanwhile, when num_predictor_palette_entries is not present (i.e., is not signaled), the value of num_predictor_palette_entries may be inferred to be a first value (e.g., 0).

In an embodiment, num_predictor_palette_entries may be encoded/decoded using a 0-th order Exp-Golomb (EG0) binarization process or bypass coding. In addition, num_predictor_palette_entries may be encoded using a fixed-length binarization process or context coding.

The variable numPredictorPaletteEntries specifies the number of reused palette entries from the palette predictor for the palette table, and may be derived to be the same value as num_predictor_palette_entries. In one example, the value of numPredictorPaletteEntries may be limited to be within a range of 0 to PredictorPaletteSize[startComp], inclusive, in order to satisfy bitstream conformance.

The syntax element palette_predictor_run may be used to determine the number of zero entries (i.e., non-reuse palette entries) preceding a non-zero entry (i.e., a reuse palette entry) in the array PalettePredictorEntryReuseFlags. palette_predictor_run may be signaled/parsed only when the variable predictorEntryIdx is smaller than numPredictorPaletteEntries (1510). Here, predictorEntryIdx corresponds to a current position in the array PalettePredictorEntryReuseFlags, and may have an index value of each palette entry in the palette predictor reused in the palette table. In one embodiment, predictorEntryIdx may be determined based on palette_predictor_run (1520). For example, only when the value of palette_predictor_run is greater than 1, the value of predictorEntryIdx may be updated to a value obtained by adding palette_predictor_run−1 to predictorEntryIdx.

In one example, the value of palette_predictor_run may be limited to be within a range of 0 to (numPredictorPaletteEntries−predictorEntryIdx), inclusive, in order to satisfy bitstream conformance. Here, the variable NumPredictedPaletteEntries may specify the number of palette entries in the reused palette table from the palette predictor. In one example, the value of NumPredictedPaletteEntries may be limited to be within a range of 0 to variable maxNumPaletteEntries, inclusive. Here, the variable maxNumPaletteEntries may specify the maximum size of the palette table. In one example, maxNumPaletteEntries may be 31 if the tree type (treeType) of the current block is a single tree (SINGLE TREE), and may be 15 if the tree type (treeType) of the current block is not a single tree (SINGLE_TREE).

The syntax element num_signalled_palette_entries may specify the number of palette entries in the palette table that are explicitly signaled for the first color component startComp of the palette table. When num_signalled_palette_entries is not present (i.e., is not signaled), the value of num_signalled_palette_entries may be inferred to be a first value (e.g., 0).

The syntax element new_palette_entries[cIdx][i] may specify the value of the i-th signaled (new) palette entry for a specific color component (cIdx).

The variable PredictorPaletteEntries[cIdx][i] may specify the i-th element (i.e., palette entry) in the palette predictor for a specific color component (cIdx).

The variable CurrentPaletteEntries[cIdx][i] may specify the i-th element (i.e., palette entry) in the palette table for a specific color component (cIdx), and may be derived as shown in Table 4 below.

TABLE 4

| Current palette (palette table) derivation process |
|---|
| The variable CurrentPaletteEntries[ cIdx ][ i ] specifies the i-th element in the current palette for the colour component cIdx and is derived as follows:<br>numPredictedPaletteEntries = 0<br>for( 1 = 0; 1 < numPredictorPatetteEntries; i++ )<br>  if( PalettePredictorEntryReuseFlags[ i ] ) {<br>    for( cIdx =startComp; cIdx < ( startComp + numComps ); cIdx++ )<br>      CurrentPaletteEntries[ cIdx ][ numPredictedPaletteEntries ] =<br>PredictorPaletteEntries[ cIdx ][ i ]<br>      numPredictedPaletteEntries++<br>    } |

TABLE 4-continued

Current palette (palette table) derivation process

```
for( cIdx = startComp; cIdx < (startComp + numComps); cIdx++)
    for( i = 0; i < num_signalled_palette_entries[startComp]; i++ )
        CurrentPaletteEntries[ cIdx ][ numPredictedPaletteEntries + i ] =
new_palette_entries[ cIdx ][ i ]
```

Referring to Table 4, the palette table CurrentPaletteEntries[cIdx][i] may be configured to include the reused palette entries PredictorPaletteEntries[cIdx][i] and signaled (new) palette entries new_palette_entries[cIdx][i] from the palette predictor. Also, unlike the method of Table 1 above, the palette table CurrentPaletteEntries[cIdx][i] may be derived based on the syntax element numPredictorPaletteEntries specifying the size of the palette predictor obtained through the bitstream. That is, in the above process, since the variable PredictorPaletteSize[startComp] derived based on the previous palette decoding result is not considered, the parsing dependency may be removed.

Meanwhile, the variable PredictorPaletteSize[startComp] specifying the size of the palette predictor and the array PredictorPaletteEntries specifying the palette predictor may be derived/modified (updated) as shown in Table 5 below.

TABLE 5

Palette predictor derivation or modification process

```
When one of the following conditions is true:
-   cIdx is equal to 0 and numComps is equal to 1;
-   cIdx is equal to 2;
the value PredictorPaletteSize[ startComp ] and the array PredictorPaletteEntries are
derived or modified as follows:
for( i = 0; i < CurrentPaletteSize[ startComp ]; i++ )
    for( cIdx = startComp; cIdx < (startComp + numComps); cIdx++ )
        newPredictorPaletteEntries[ cIdx ][ i ] = CurrentPaletteEntries[ cIdx ][ i ]
newPredictorPaletteSize = CurrentPaletteSize[ startComp ]
for( i = 0; i < numPredictorPaletteEntries && newPredictorPaletteSize <
maxNumPalettePredictorSize; i++ )
    if( !PalettePredictorEntryReuseFlags[ i ] ) {
        for( cIdx = startComp; cIdx < (startComp + numComps); cIdx++ )
            newPredictorPaletteEntries[ cIdx ][ newPredictorPaletteSize ] =
                PredictorPaletteEntries[ cIdx ][ i ]
        newPredictorPaletteSize++
    }
for( cIdx = startComp; cIdx < ( startComp + numComps ); cIdx++ )
    for( i = 0; i < newPredictorPaletteSize; i++ )
        PredictorPaletteEntries[ cIdx ][ i ] = newPredictorPaletteEntries[ cIdx ][ i ]
    PredictorPaletteSize[ startComp ] = newPredictorPaletteSize
When qtbtt_dual_tree_intra_flag is equal to 0 or slice_type is not equal to I, the following
applies:
    PredictorPaletteSize[ 1 ] = newPredictorPaletteSize
```

Referring to Table 5, the variable PredictorPaletteSize[startComp] and the array PredictorPaletteEntries may be derived/modified (updated) only when the variable cIdx is 0 and the variable numComps is 1 or the variable cIdx is 2. In addition, unlike the method of Table 2 described above, the process of constructing a palette predictor using a palette entry that is not reused in the palette table may be performed based on the syntax element numPredictorPaletteEntries specifying the size of the palette predictor obtained through the bitstream. That is, in the above process, since the variable PredictorPaletteSize[startComp] derived based on the previous palette decoding result is not considered, the parsing dependency may be removed.

Hereinafter, an image encoding/decoding method according to an embodiment of the present disclosure will be described in detail with reference to FIGS. 16 and 17.

FIG. 16 is a flowchart illustrating an image encoding method according to an embodiment of the present disclosure.

The palette encoding method of FIG. 16 may be performed by the image encoding apparatus of FIG. 2. For example, steps S1610 and S1620 may be performed by the intra prediction unit 165 or a separate functional block (e.g., a palette encoder). Also, steps S1630 and S1640 may be performed by the entropy encoder 190.

Referring to FIG. 16, the image encoding apparatus may construct a palette table based on a palette predictor for a current block (S1610).

The palette predictor may include at least one palette entry (representative color value) and a palette index for identifying each palette entry. When the current block is a first palette-coded block in a CTU or slice, the palette predictor may have a predetermined initial value (e.g., 0). In contrast, when the current block is not a first palette-coded block in the CTU or slice, the palette predictor may have a value predetermined through a previous palette encoding process.

The palette table (or the current palette) may be constructed based on the palette predictor. For example, the palette table may include at least one reused palette entry from the palette predictor and a palette index for identifying each palette entry.

In an example, the palette predictor and the palette table may be variously constructed accordingly a color format (or a chroma format) of a current block. For example, when the color format of the current block is a monochrome format, the palette predictor and the palette table may include only a palette entry for a luma component of the current block. On the other hand, in case the color format of the current block is 4:2:0, 4:2:2 or 4:4:4, the palette predictor and the palette table may include palette entries for a luma component and a chroma component of the current block, respectively.

In an example, the palette predictor and the palette table may be variously constructed according to a split structure of a current block. For example, when the current block has a single tree structure, the palette predictor and the palette table may have a single configuration commonly applicable to the luma component and chroma component of the current block. In contrast, when the current block has a dual tree structure, the palette predictor and the palette table may have multiple configurations individually applied to each of the luma component and chroma component of the current block. For example, the palette predictor for the current block of the dual tree structure may include a luma palette predictor for the luma component and a chroma palette predictor for the chroma component. In this case, the number of palette entries included in the luma palette predictor may be different from the number of palette entries included in the chroma palette predictor.

The image encoding apparatus may generate a palette index map for the current block based on the palette table (S1620).

The palette index map may mean that a predetermined palette index in the palette table is mapped to each sample in the current block. For example, a palette index specifying a representative color value may be mapped to a sample having a sample value equal or similar to the representative color value defined in the palette table among a plurality of samples in the current block. In contrast, an escape palette index may be mapped to a sample (escape sample) having a sample value not similar to the representative color value defined in the palette table among the plurality of samples in the current block. In an example, whether a pixel value of each sample is similar to the representative color value defined in the palette table may be determined based on a predetermined threshold. For example, when a difference between a sample value of each sample and a representative color value is equal to or less than a predetermined threshold, a palette index specifying the representative color value may be mapped to the corresponding sample. In contrast, when the difference between the sample value of each sample and the representative color value exceeds the predetermined threshold, an escape palette index may be mapped to the corresponding sample.

The image encoding apparatus may encode the current block based on the palette index map (S1630).

The encoding process of the current block may be performed by scanning the palette indices in the palette index map according to a predetermined scan method. Specifically, the image encoding apparatus may determine an encoding mode (palette sample mode) of each of the palette indices by scanning the palette indices mapped to the current block according to the predetermined scan method.

The scan method for palette encoding may include horizontal traverse scan and vertical traverse scan as described above with reference to FIG. 5. In an example, information on the scan method may be signaled using palette_transpose_flag. For example, when horizontal traverse scan is used for palette encoding of the current block, palette_transpose_flag having a first value (e.g., 0) may be signaled. In contrast, when vertical traverse scan is used for palette encoding of the current block, palette_transpose_flag having a second value (e.g., 1) may be signaled.

An encoding mode for encoding each of the palette indices mapped to the current block may be referred to as a palette sample mode. The palette sample mode may include an INDEX mode and a COPY_ABOVE mode. When the palette sample mode is determined to be the INDEX mode, the value of the corresponding palette index may be encoded. In contrast, when the palette sample mode is determined to be the COPY_ABOVE mode, the value of the corresponding palette index may not be encoded, and information specifying that the corresponding palette index has the same value as a palette index present at the same location in the immediately upper row may be encoded. In an example, information on the palette sample mode may be signaled using copy_above_palette_indices_flag. For example, when the palette sample mode for a current sample is determined to be the INDEX mode, copy_above_palette_indices_flag having a first value (e.g., 0) may be signaled. In contrast, when the palette sample mode for the current sample is determined to be the COPY_ABOVE mode, copy_above_palette_indices_flag having a second value (e.g., 1) may be signaled.

In addition, in the 'INDEX' mode and the 'COPY_ABOVE' mode, run-value information specifying the number of palette indices continuously encoded using the same palette sample mode may be additionally encoded.

Meanwhile, in case of an escape sample, a quantized pixel value of the escape sample may be encoded. In an example, whether the current block includes the escape sample may be signaled using an escape sample flag (e.g., palette_escape_val_present_flag). For example, when the current block does not include the escape sample, palette_escape_val_present_flag having a first value (e.g., 0) may be signaled. In contrast, when the current block includes the escape sample, palette_escape_val_present_flag having a second value (e.g., 1) may be signaled.

The image encoding apparatus may generate a bitstream including palette prediction information and palette index information of the encoded current block (S1640).

The palette prediction information may include run-value information (e.g., palette_predictor_run) specifying a first palette entry reused in the palette table among palette entries in the palette predictor for the current block.

In an embodiment, the run-value information may be encoded in the bitstream only when the index value of the first palette entry is smaller than the size of the palette predictor.

In another embodiment, the run-value information may be encoded in the bitstream only when the index value of the first palette entry is smaller than the maximum size of the palette predictor. Here, the maximum size of the palette predictor means the maximum number of palette entries that may be included in the palette predictor, and may be determined based on the split structure of a coding tree unit (CTU) including the current block. For example, the maximum size of the palette predictor may be determined to be 63 based on the current block being included in the I slice and the CTU (coding tree unit) including the current block being split into a single tree structure. Alternatively, based on the current block being included in the I slice, and a coding tree unit (CTU) including the current block being implicit-quadtree-split into a 64×64 luma sample coding unit (CU), and the 64×64 luma sample CU becoming a root node of the dual tree, the maximum size of the palette predictor may be determined to be 31.

On the other hand, in one embodiment, the index value of the first palette entry may be determined based on the run-value information. For example, only when the run-value is greater than 1, the index value of the first palette entry may be updated by adding the run-value and then subtracting 1.

Palette index information may include information on the palette index map. For example, the palette index information may include PaletteIndexMap[xC][yC] specifying at least one palette index mapped to the current block. In addition, the palette index information may include PaletteRunMinus1 specifying the run-value of the palette index included in the palette index map.

Meanwhile, the image encoding apparatus may further include updating the palette predictor using the palette table for the current block. For example, the image encoding apparatus may update the palette predictor by adding at least one palette entry, which is included in the palette table, to the palette predictor. In addition, the image encoding apparatus may update the palette predictor by replacing at least one palette entry, which is included in the palette predictor, with at least one palette entry included in the palette table. In this case, the palette entry replaced in the palette predictor may be determined to be the oldest palette entry or least frequently used palette entry according to a first-in first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added to a palette predictor. This may be referred to as palette stuffing. In addition, information on the updated palette predictor may be encoded and signaled.

Figure 17:
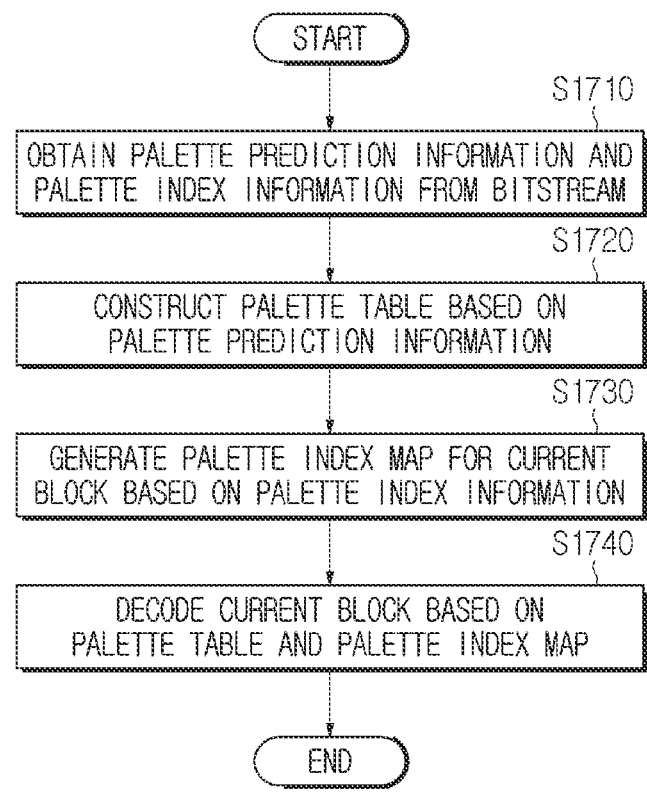
FIG. 17 is a flowchart illustrating a palette decoding method according to an embodiment of the present disclosure.

FIG. 17 is a flowchart illustrating a palette decoding method according to an embodiment of the present disclosure.

The palette decoding method of FIG. 17 may be performed by the image decoding apparatus of FIG. 3. For example, steps S1710 to S1730 may be performed by the intra prediction unit 265. Also, step S1740 may be performed by the entropy decoder 210.

Referring to FIG. 17, the image decoding apparatus may obtain palette prediction information and palette index prediction information of the current block from a bitstream (S1710).

The palette prediction information may include run-value information (e.g., palette_predictor_run) specifying a first palette entry reused in the palette table among palette entries in the palette predictor for the current block.

In an embodiment, the run-value information may be obtained from the bitstream only when the index value of the first palette entry is smaller than the size of the palette predictor. In this case, the size of the palette predictor may be determined based on the palette table for the block decoded before the current block. For example, when palette decoding is performed on a block preceding the current block in decoding order, the palette predictor and the size thereof may be updated based on the palette table for the preceding block. In addition, the updated palette predictor may be used for palette decoding of the current block. A method of updating the palette predictor and the size thereof is the same as described above with reference to Table 1 or Table 5. On the other hand, the size of the palette predictor may be determined based on the size information of the palette predictor obtained from the bitstream. For example, the size of the palette predictor may be determined based on the syntax element num_predictor_palette_entries explicitly signaled from the bitstream.

In another embodiment, the run-value information may be encoded in the bitstream only when the index value of the first palette entry is smaller than the maximum size of the palette predictor. Here, the maximum size of the palette predictor means the maximum number of palette entries that may be included in the palette predictor, and may be determined based on a predetermined flag (e.g., qtbtt_dual_tree_intra_flag) specifying the split structure of a coding tree unit (CTU) including the current block. For example, based on qtbtt_dual_tree_intra_flag having a first value (e.g., 0) specifying that the current block is included in an I slice, and that the CTU including the current block is split into a single tree structure, the maximum size of the palette predictor may be determined to be 63. Alternatively, based on the qtbtt_dual_tree_intra_flag having a second value (e.g., 1) specifying that the current block is included in an I slice, the CTU including the current block is implicit-quadtree-split into a 64×64 luma sample coding unit (CU), and the 64×64 luma sample CU becomes a root node of a dual tree, the maximum size of the palette predictor may be determined to be 31.

On the other hand, in one embodiment, the index value of the first palette entry may be determined based on the run-value information. For example, only when the run-value is greater than 1, the index value of the first palette entry may be updated by adding the run-value and then subtracting 1.

The palette index information may include information on a palette index map. In an example, the image decoding apparatus may obtain at least one palette index mapped to the current block by decoding PaletteIndexMap[xC][yC] included in the bitstream. Here, xC and yC may specify relative positions of the current sample based on the top-left sample of a CTU (or slice) to which the current block belongs. In an example, the image decoding apparatus may obtain run-value information of the palette index included in the palette index map by decoding PaletteRunMinus1 included in the bitstream.

The image decoding apparatus may construct a palette table for the current block based on the palette prediction information (S1720).

In an example, the image decoding apparatus may construct the palette predictor for the current block based PredictorPaletteEntries[cIdx][i] obtained from the bitstream. The palette predictor may have, for example, a predetermined value (e.g., 0) initialized at a first decoding time of the CTU (or slice) including the current block. Alternatively, the palette predictor may have the same configuration as the palette predictor updated in a previous palette decoding process.

The palette table (or the current palette) may be constructed based on the palette predictor. The palette table may include at least one of the palette entry included in the palette predictor or the new palette entry obtained from the bitstream and a palette index for identifying each palette entry.

In an example, the palette predictor and the palette table may be variously constructed accordingly a color format (or a chroma format) of a current block. For example, the palette predictor and the palette table may include only a palette entry for a luma component or a palette entry for each of a luma component and a chroma component, according to the color format of the current block.

In an example, the palette predictor and the palette table may be variously constructed accordingly a split structure of a current block. For example, when the current block has a single tree structure, the palette predictor and the palette table may have a single configuration commonly applying to the luma component and chroma component of the current block. In contrast, when the current block has a dual tree structure, the palette predictor and the palette table may have multiple configurations separately applying to the luma component and chroma component of the current block.

The image decoding apparatus may generate a palette index map for the current block based on the palette index information (S1730). Specifically, the image decoding apparatus may generate the palette index map by mapping the palette index to each sample in the current block according to a predetermined scan method by means of the palette index obtained from the bitstream, the palette sample mode and the run-value of the palette sample mode.

The scan method for palette decoding may include horizontal traverse scan and vertical traverse scan as described above with reference to FIG. 5. In an example, the scan method for palette decoding may be determined by decoding palette_transpose_flag included in the bitstream. For example, when palette_transpose_flag has a first value (e.g., 0), the scan method for palette decoding may be determined to be horizontal traverse scan. In contrast, when palette_transpose_flag has a second value (e.g., 1), the scan method for palette decoding may be determined to be vertical traverse scan.

The palette sample mode may include an INDEX mode and a COPY_ABOVE mode, as described above. When the INDEX mode is applied to the current sample, the value of the palette index mapped to the current sample may be directly obtained from the bitstream. In contrast, when the COPY_ABOVE mode is applied to the current sample, the value of the palette index mapped to the current sample may be determined to be the value of the palette index mapped to a sample at the same location in the upper rower of the current sample.

Meanwhile, when the current sample is an escape sample, a quantized pixel value of the current sample may be directly obtained from the bitstream. An escape palette index may be mapped to the escape sample.

The image decoding apparatus may decode the current block based on the palette table and the palette index map for the current block (S1740). Specifically, the image decoding apparatus may generate a prediction block for the current block by inversely mapping the value of each palette index in the palette index map to a representative color value with reference to the palette table.

Meanwhile, the image decoding method may further include updating the palette predictor using the palette table for the current block. For example, the image decoding apparatus may update the palette predictor by adding at least one palette entry, which is included in the palette table, to the palette predictor. In addition, the image decoding apparatus may also update the palette predictor by replacing at least one palette entry, which is included in the palette predictor, with at least one palette entry included in the palette table. In this case, the palette entry replaced in the palette predictor may be determined to be the oldest palette entry or least frequently used palette entry according to a first-in first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added to a palette predictor. This may be referred to as palette stuffing.

In an example, the image decoding apparatus may update the palette predictor based on update information of the palette predictor signaled from the image encoding apparatus.

As described above, in the image encoding/decoding method according to an embodiment of the present disclosure, in the process of signaling/parsing run-value information (e.g., palette_predictor_run) specifying a reuse palette entry in a palette predictor, a predetermined termination indicator (e.g., palette_predictor_run with a value of 1) for terminating a process of searching for the reuse palette entry may be signaled without condition. In addition, the run-value information may be signaled/parsed based on the maximum size (e.g., maxNumPalettePredictorSize) of the palette predictor instead of the size of the palette predictor (e.g., PredictorPaletteSize[startComp]). Accordingly, a parsing dependency on the previous palette encoding/decoding result is removed, and thus the throughput and efficiency of the image encoding/decoding apparatus may be further improved.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 18:
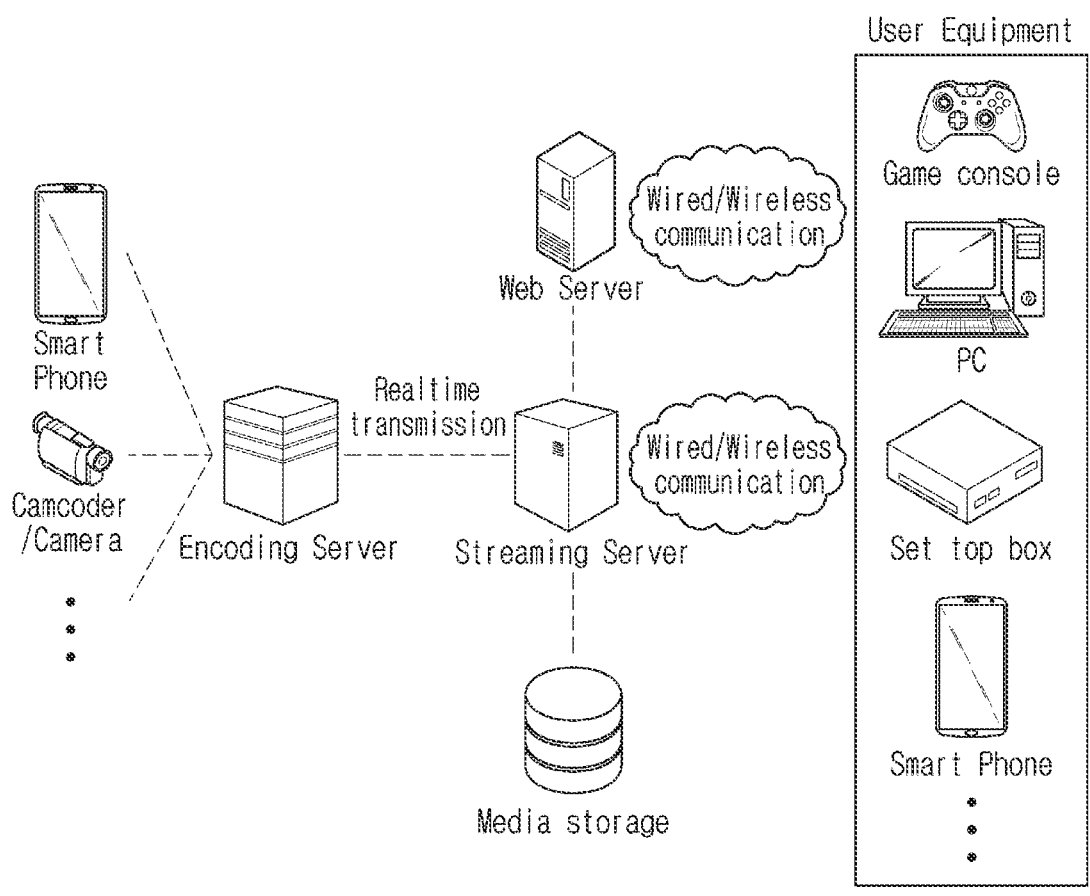
FIG. 18 is a view showing a content streaming system, to which an embodiment according to the present disclosure is applicable.

FIG. 18 is a view showing a contents streaming system, to which an embodiment of the present disclosure is applicable.

As shown in FIG. 18, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

obtaining palette prediction information and palette index information of a current block from a bitstream;

constructing a palette table for the current block based on the palette prediction information;

generating a palette index map for the current block based on the palette index information; and decoding the current block based on the palette table and the palette index map, wherein the palette prediction information comprises run-value information specifying a first palette entry reused in the palette table among palette entries in a palette predictor for the current block, wherein the run-value information is obtained from the bitstream based on an index value of the first palette entry being smaller than a first size of the palette predictor and maximum size information for the palette predictor without size information for the palette predictor, wherein, based on only a value of the run-value information being greater than 1, a value related to a palette predictor is updated, wherein, based on the run-value information having a value of 1, search of the first palette entry is terminated.

2. The image decoding method of claim 1, wherein the index value of the first palette entry is determined based on the run-value information.

3. The image decoding method of claim 1, wherein the first size specifies the number of palette entries determined based on a palette table for a block decoded before the current block.

4. The image decoding method of claim 1, wherein the first size specifies the number of palette entries determined based on size information of the palette predictor obtained from the bitstream.

5. The image decoding method of claim 1, wherein the first size specifies a maximum number of palette entries able to be included in the palette predictor.

6. The image decoding method of claim 5, wherein the first size is determined based on a predetermined first flag specifying a split structure of a coding tree unit (CTU) comprising the current block.

7. The image decoding method of claim 6, wherein the first size is determined to be 63, based on the first flag having a first value specifying that the current block is included in an I slice and the CTU is split into a single tree structure.

8. The image decoding method of claim 6, wherein the first size is determined to be 31, based on the first flag having a second value specifying that the current block is included in an I slice, the CTU is implicit-quadtree-split into a 64×64 luma sample coding unit (CU), and the 64×64 luma sample CU becomes a root node of a dual tree.

9. The image decoding method of claim 1, further comprising updating the palette predictor based on the palette table and reuse information of the palette predictor, based on the current block being decoded.

10. An image encoding method performed by an image encoding apparatus, the image encoding method comprising:

constructing a palette table for a current block based on a palette predictor for the current block;

generating a palette index map for the current block based on the palette table;

encoding the current block based on the palette index map; and generating a bitstream comprising palette prediction information and palette index information of the encoded current block, wherein the palette prediction information comprises run-value information specifying a first palette entry reused in the palette table among palette entries in the palette predictor for the current block, wherein the run-value information is encoded in the bitstream based on an index value of the first palette entry being smaller than a maximum size of the palette predictor and maximum size information for the palette predictor without size information for the palette predictor, wherein, based on only a value of the run-value information being greater than 1, a value related to a palette predictor is updated, wherein, based on the run-value information having a value of 1, search of the first palette entry is terminated.

11. The image encoding method of claim 10, wherein the index value of the first palette entry is determined based on the run-value information.

12. The image encoding method of claim 10, wherein the maximum size of the palette predictor is determined to be 63, based on the current block being included in an I slice and a coding tree unit (CTU) comprising the current block being split into a single tree structure.

13. The image encoding method of claim 10, wherein the maximum size of the palette predictor is determined to be 31, based on the current block being included in an I slice, a coding tree unit (CTU) including the current block being implicit-quadtree-split into a 64×64 luma sample coding unit (CU), and the 64×64 luma sample CU becoming a root node of a dual tree.

14. A non-transitory computer-readable recording medium storing a bitstream generated by an image encoding method, the image encoding method comprising:

constructing a palette table for a current block based on a palette predictor for the current block;

generating a palette index map for the current block based on the palette table;

encoding the current block based on the palette index map; and generating a bitstream comprising palette prediction information and palette index information of the encoded current block, wherein the palette prediction information comprises run-value information specifying a first palette entry reused in the palette table among palette entries in the palette predictor for the current block, wherein the run-value information is encoded in the bitstream based on an index value of the first palette entry being smaller than a maximum size of the palette predictor and maximum size information for the palette predictor without size information for the palette predictor, wherein, based on only a value of the run-value information being greater than 1, a value related to a palette predictor is updated, wherein, based on the run-value information having a value of 1, search of the first palette entry is terminated.

* * * * *